United States Patent [19]
Kami et al.

[11] Patent Number: 4,565,389
[45] Date of Patent: Jan. 21, 1986

[54] VEHICLE SUSPENSION SYSTEM

[75] Inventors: Yozo Kami, Saitama; Masaaki Minakawa; Kanji Kubo, both of Tokyo, all of Japan

[73] Assignee: Honda Giken Kogyo Kabushiki Kaisha, Shibuya, Japan

[21] Appl. No.: 554,515

[22] Filed: Nov. 23, 1983

[30] Foreign Application Priority Data

Nov. 24, 1982 [JP] Japan ............................ 57-177930[U]
Nov. 24, 1982 [JP] Japan ............................ 57-177931[U]

[51] Int. Cl.⁴ .............................................. B60G 3/00
[52] U.S. Cl. .................................... 280/663; 180/256; 280/688
[58] Field of Search ...................... 280/663, 96.1, 661, 280/664, 665, 688; 180/256

[56] References Cited

U.S. PATENT DOCUMENTS

| | | | |
|---|---|---|---|
| 2,994,396 | 8/1961 | Bidwell | 280/663 |
| 3,169,026 | 2/1965 | Soer | 280/663 |
| 3,256,028 | 6/1966 | Fehlberg | 280/661 |
| 3,630,303 | 12/1971 | Froumajos | 180/256 |

Primary Examiner—Richard A. Bertsch
Attorney, Agent, or Firm—Armstrong, Nikaido, Marmelstein & Kubovcik

[57] ABSTRACT

A vehicle suspension system comprising a knuckle arm supporting a wheel, upper and lower arms connecting the knuckle arm to a frame of a vehicle body, and a radius rod and a stabilizer each having an end attached to the lower arm in the vicinity of an end thereof connected to the knuckle arm. The lower arm has an attachment aperture defined therethrough substantially longitudinally of the vehicle body. Either the radius rod or the stabilizer is coupled to one of upper and lower surfaces of the lower arm, the other being inserted in the attachment aperture and coupled to the lower arm therein.

13 Claims, 6 Drawing Figures

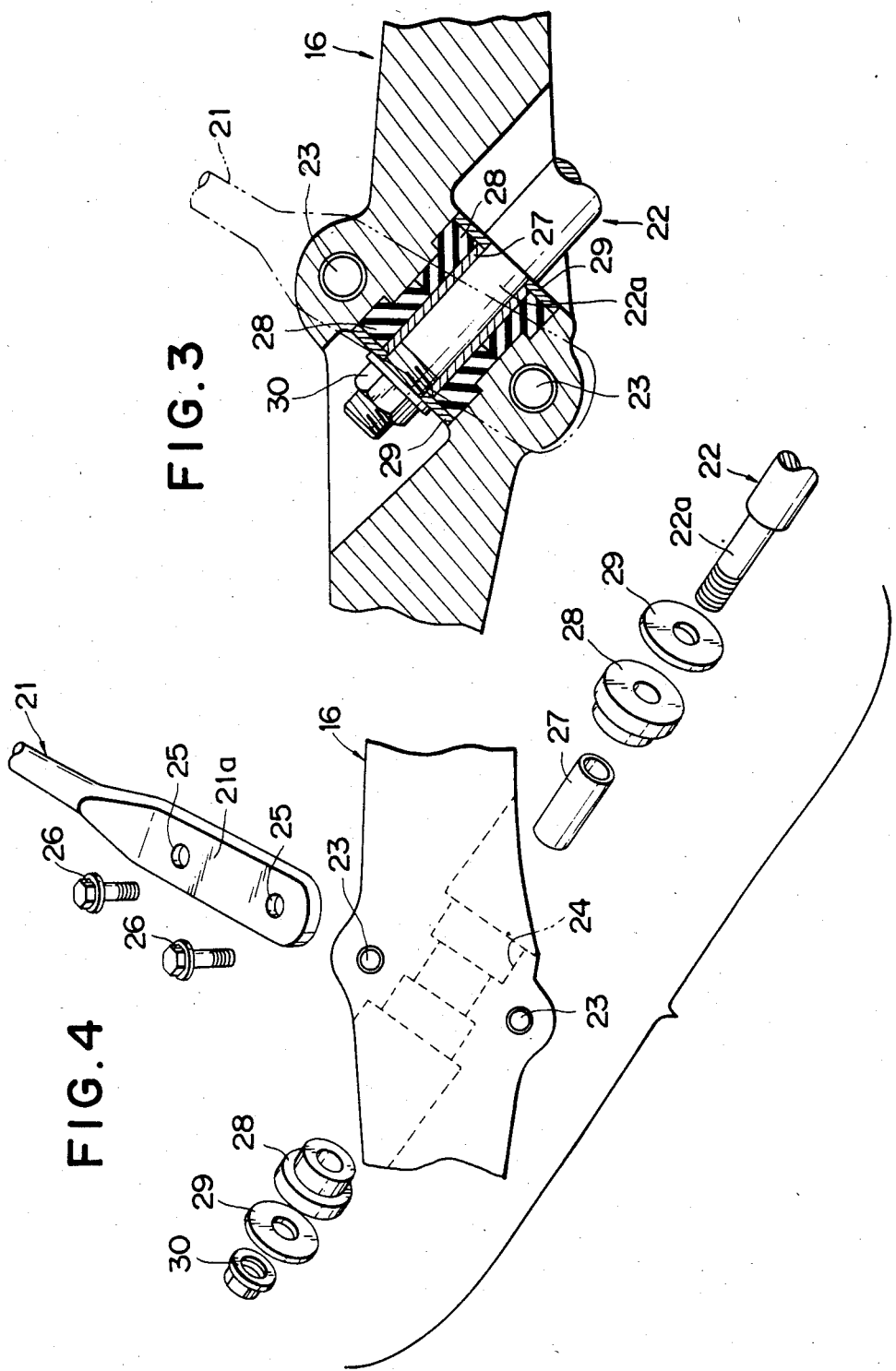

VEHICLE SUSPENSION SYSTEM

BACKGROUND OF THE INVENTION

1. Field of the Invention

The present invention relates to a vehicle suspension system, and more particularly to a vehicle suspension system of an improved construction attaching a radius rod and a stabilizer to a lower arm.

2. Description of the Prior Art

There are known double-wishbone suspensions of the type in which a knuckle arm supporting a wheel is supported on a vehicle body by upper and lower arms, with ends of a radius rod (strut rod) and a stabilizer (anti-roll bar) being connected to the lower arm. In such a vehicle suspension unit, it has been conventional practice to attach either the radius rod or the stabilizer to the lower arm adjacent to the wheel while positioning the other inwardly thereof toward the vehicle body in order to avoid mutual interference between the radius rod and the stabilizer. However, it is preferable that the ends of both the radius rod and the stabilizer be placed as closely to the wheel as possible for their better performance.

In the installation where the other end of the radius rod is longitudinally adjustably mounted on the vehicle body, any longitudinal adjustment of the radius rod through the loosening of a nut has heretofore allowed a rubber bushing interposed between the radius rod and a vehicle body frame, a collar, and a washer to be disassembled under the resilient force of the rubber bushing. For this reason, it has been tedious and time-consuming to adjust the length of the radius rod.

The present invention has been made with a view to achieving the preferred positioning and eliminating the foregoing problem.

SUMMARY OF THE INVENTION

Accordingly, it is an object of the present invention to provide a vehicle suspension system having a radius rod and a stabilizer, both of which are attached to a lower arm as closely to a wheel as possible for enabling the radius rod and the stabilizer to perform their intended function sufficiently.

Another object of the present invention is to provide a vehicle suspension system in which a radius rod can easily be adjusted in length.

According to the present invention, there is provided a vehicle suspension system comprising a wheel, a knuckle arm supporting the wheel, a vehicle body having a frame, upper and lower arms connecting the knuckle arm to the frame, the lower arm having an attachment aperture defined therethrough substantially longitudinally of the vehicle body, a radius arm and a stabilizer each having one end attached to the lower arm in the vicinity of an end thereof connected to the knuckle arm, one of the radius rod and the stabilizer being coupled to one of upper and lower surfaces of the lower arm, the other of the radius rod and the stabilizer being inserted in the attachment aperture and coupled to the lower arm therein.

The radius rod has an opposite end fastened to the vehicle body frame through a main collar loosely fitted over the opposite end of the radius rod, a rubber bushing fitted over the main collar, a pair of washers disposed around the radius rod and held respectively against axial ends of the main collar and the rubber bushing, and auxiliary collars force-fitted between the main collar and washers and the radius rod.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is an enlarged fragmentary cross-sectional view of a lower arm to which a radius rod and a stabilizer are connected;

FIG. 4 is an exploded perspective view of the lower arm, the radius rod, and the stabilizer;

DESCRIPTION OF THE PREFERRED EMBODIMENTS

Figure 1:
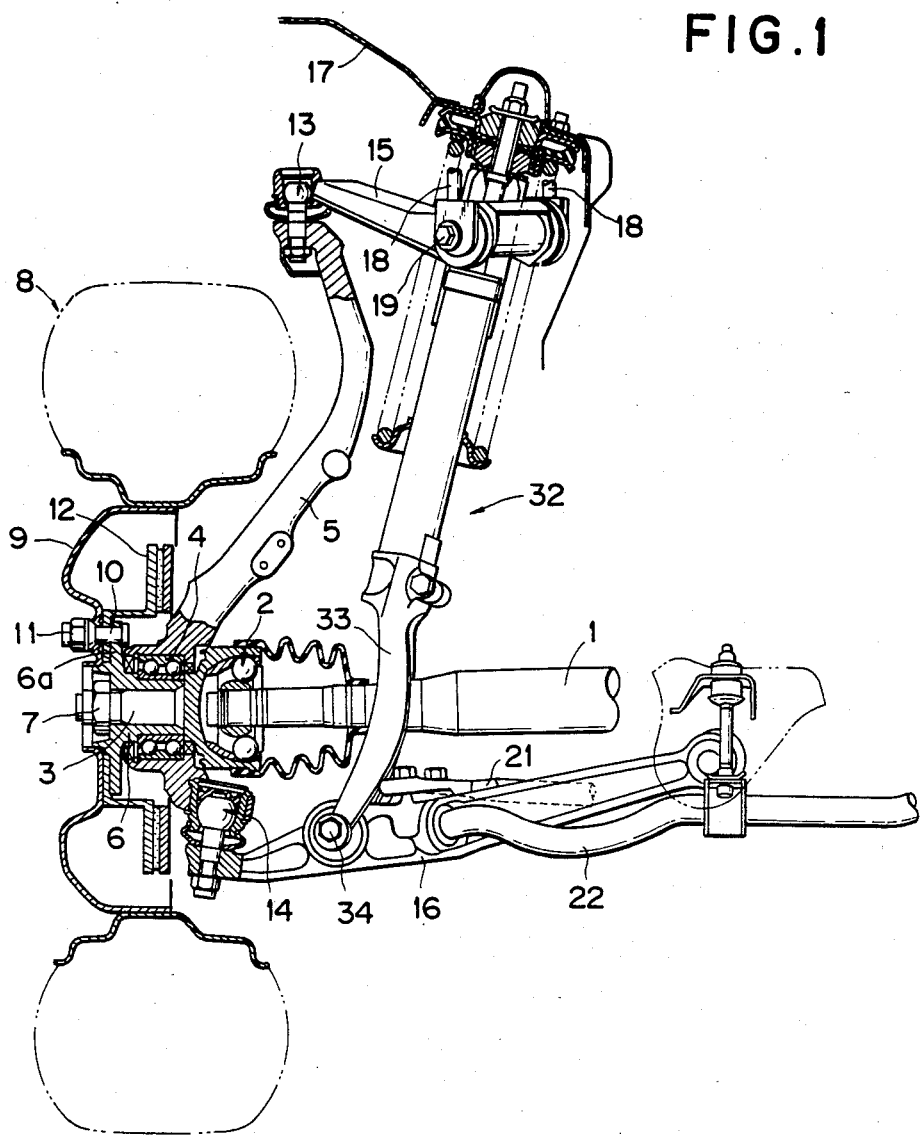
FIG. 1 is a rear elevational view, partly in cross-section, of a vehicle suspension system according to the present invention for a lefthand wheel as seen from behind the vehicle.
Figure 2:
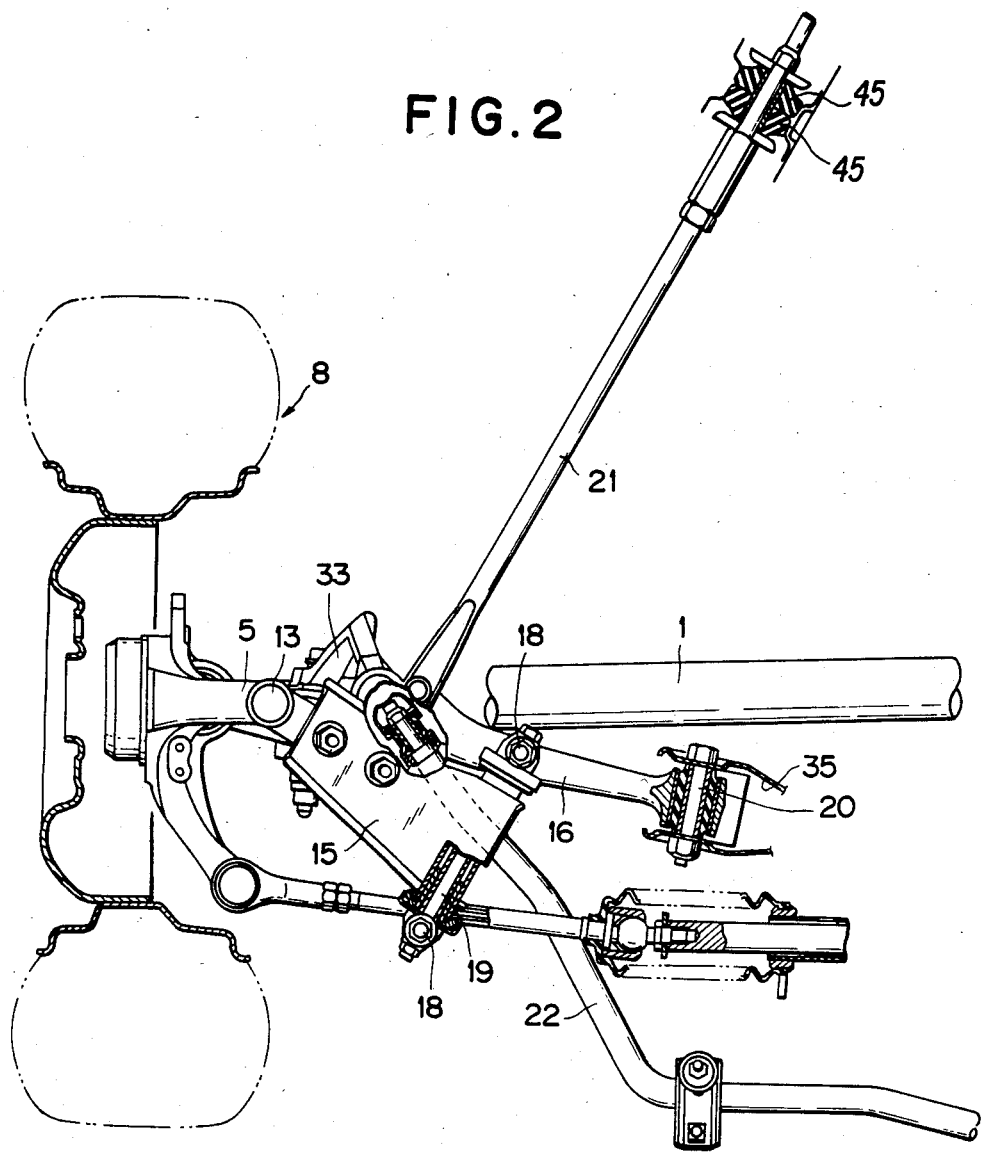
FIG. 2 is a plan view of the vehicle suspension system shown in FIG. 1.

FIGS. 1 and 2 show a vehicle suspension system of the double-wishbone type. A drive axle 1 extends transversely of a vehicle body and has one end connected through a constant-velocity universal joint 2 to a wheel spindle 3. A hub 6 is splined around the wheel spindle 3 and rotatably supported by a bearing 4 on a knuckle arm 5. The hub 6 is fixed to the wheel spindle 3 by a nut 7 threaded over an end of the wheel spindle 3. The hub 6 includes a flange 6a to which a wheel disk 9 of a wheel 8 is fastened by bolts 10 and nuts 11. A brake disk 12 is fastened between the hub flange 6a and the wheel disk 9.

To the upper and lower ends of the knuckle arm 5, there are connected ends of upper and lower arms 15, 16, respectively, the lower arm 16 comprising a casting.

As shown in FIG. 2, the upper arm 15 is obliquely directed toward the rear end of the vehicle body and has an opposite end coupled to a side frame 17 by a pair of bolts 18, 18. The upper arm 15 is vertically angularly movable about a bolt 19 attached to the bolts 18, 18 (FIG. 1). The other end of the lower arm 16 is likewise coupled to a vehicle body frame 35 by a bolt 20 for vertical angular movement about the bolt 20.

A shock absorber 32 is connected between the vehicle body and the lower arm 16. Since the upper arm 15 is obliquely displaced toward the rear of the vehicle body, there is no physical interference between the shock absorber 32 and the upper arm 15. A bifurcated fork member 33 is fixed to the lower end of the shock absorber 32 above the drive axle 1 and pivotally attached to the lower arm 16 by a bolt 34 in straddling relation to the drive axle 1. Therefore, the lower end of the shock absorber 32 is prevented from interfering with the drive axle 1.

When the wheel 8 moves up and down as it runs on an irregular road surface, the upper and lower arms 15, 16 coupled respectively to the upper and lower ends of the knuckle arm 5 swing vertically about the bolts or pivots 19, 20. The swinging movement of the upper and lower arms 15, 16 produces a dampening force in the shock absorber 32 which is effective in taking up shocks transmitted through the wheel 8, thus giving passengers on the vehicle better riding comfort.

A radius rod 21 known as a strut rod and a stabilizer 22 known as an anti-roll bar are connected at their one ends to the lower arm 16 adjacent to the wheel 8, the radius rod 21 and the stabilizer 22 extending obliquely toward the front and rear ends, respectively, of the vehicle body. More specifically, as shown in FIG. 4, the lower arm 16 has on an upper surface thereof an attachment seat for the radius rod 21 with substantially vertical threaded bolt holes 23, 23 defined in the attachment seat at front and rear ends thereof. The lower arm 16 also has an attachment aperture 24 defined obliquely therethrough between the threaded bolt holes 23, 23 out of interference therewith, the attachment aperture 24 having larger- and smaller-diameter portions.

The radius rod 21 has a flattened end 21a with bolt insertion holes 25, 25 spaced from each other longitudinally of the radius rod 21. The flattened end 21a of the radius rod 21 is held against the attachment seat and fastened thereto by two bolts 26, 26 extending through the bolt insertion holes 25, 25 and threaded into the threaded bolt holes 23, 23.

The stabilizer 22 has a smaller-diameter externally threaded end portion 22a extending through the attachment aperture 24 as illustrated in FIG. 3. The externally threaded end portion 22a is supported in the lower arm 16 by a collar 27 fitted over the end portion 22a and a pair of rubber bushings 28, 28 fitted over the collar 27 and axially sandwiched between a pair of washers 29, 29, the rubber bushings 28, 28 being fitted in smaller-diameter portions of the attachment aperture 25.

The stabilizer 22 is fastened to the lower arm 16 by a nut 30 threaded over an outermost end of the smaller-diameter externally threaded end portion 22a of the stabilizer 22. The rubber bushings 28, 28 allow the stabilizer 22 to turn about its own axis in twisting motion with respect to the lower arm 16.

The radius rod 21 has an end opposite to the flattened end 21a which is mounted on a vehicle body frame by a pair of rubber bushings 45, 45. The stabilizer 22 has a central portion fixed to the vehicle body.

Figure 5:
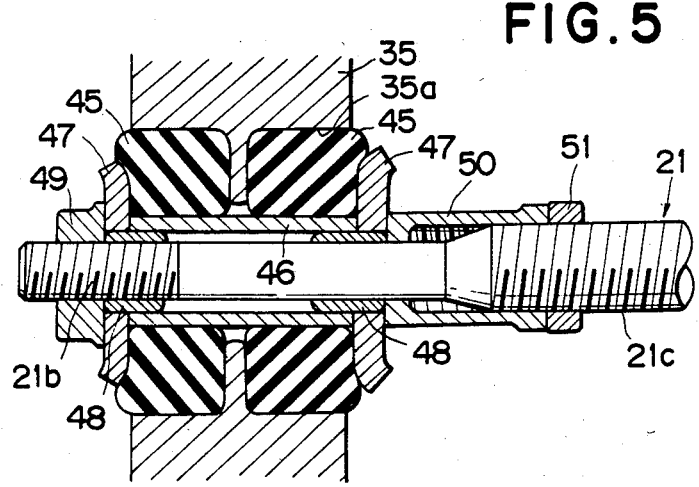
FIG. 5 is an enlarged fragmentary transverse cross-sectional view of a vehicle body frame to which the radius rod is attached.

The opposite end of the radius rod 21 is mounted on the vehicle body frame 35 as shown in greater detail in FIG. 5. More specifically, the vehicle body frame 35 has an opening 35a in which two rubber bushings 45, 45, are fitted therefor. A main collar 46 is fitted in the rubber bushings 45, 45 and is supported on end 21b of radius rod 21 on auxiliary collars 48, 48. A pair of washers 47, 47 are fitted over the smaller-diameter externally threaded portion 21b and disposed outwardly of the rubber bushings 45, 45, respectively. Auxiliary collars 48, 48 are force-fitted in the collar 46 and the washers 47, 47 and over the smaller-diameter externally threaded portion 21b, the auxiliary collars 48, 48 extending axially across abutting ends of the collar 46 and the washers 47, 47.

For attachment of the radius rod 21 to the vehicle body frame 35, the smaller-diameter externally threaded portion 21b is inserted into the opening 35a in the vehicle body frame 35. Then, a nut 49 is threaded over the smaller-diameter externally threaded portion 21b against the washer 47, and a nut 50 is also threaded over a larger-diameter externally threaded portion 21c of the radius rod 21 against the washer 47. A lock nut 51 is also threaded over the larger-diameter externally threaded portion 21c against the nut 51. The radius rod 21 is thus mounted on the vehicle body frame 35.

The radius rod 21 can be adjusted in length in the following manner:

When the nuts 49, 50 and the lock nut 51 are loosened, any axially outward resilient forces of the rubber bushings 45, 45 are prevented by the frictional resistance between the contact surfaces of the washers 47 and the auxiliary collars 48 which hold washers 47, 47 fixed and prevent movement. Since the auxiliary collars 48 are force-fitted between collar 46 and between the washers 47, the rubber bushings 45, 45, the collar 46, and the washers 47, 47 are hold against disassembled during the longitudinal adjustment of the radius rod 21.

Figure 6:
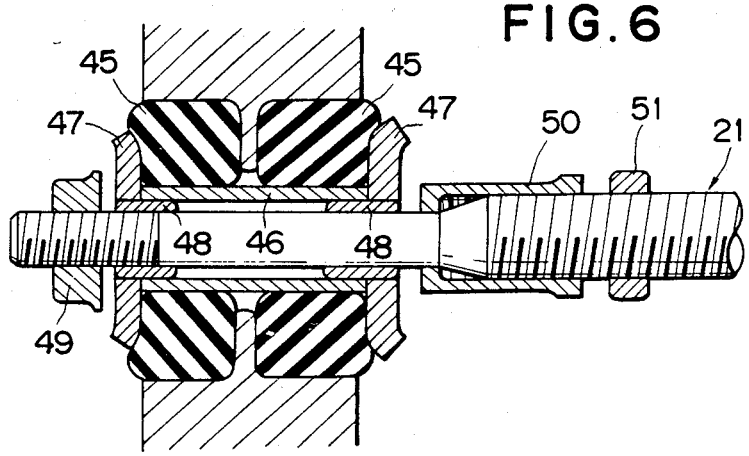
FIG. 6 is a view similar to FIG. 5, showing the parts position prior to the tightening of nuts after the radius rod has been adjusted in length.

After the radius rod 21 has been moved for ajusting its axial position as shown in FIG. 6, the nuts 49, 50 and the lock nut 51 are re-tightened to secure the radius rod 21 in the axially adjusted position.

Since the rubber bushings 45, 45, the collar 46, and the washers 47, 47 are held and remain assembled, the radius rod 21 is kept positionally stable. Thus, the radius rod 21 can be easily and accurately ajusted longitudinally.

The radius rod 21 and the stabilizer 22 are attached to the lower arm 16 in the same position thereon and close to the wheel 8 as possible. Therefore, the radius rod 21 and the stabilizer 22 are capable of performing their intended functions in an improved manner.

While, in the illustrated embodiment, the radius rod 21 is fastened to the upper surface of the lower arm 16 by the bolts 26, the radius rod 21 may instead be fastened to the lower surface of the lower arm 16 by the bolts. In the foregoing embodiment, the radius rod 21 is bolted to the lower arm 16 while the stabilizer 22 is inserted therein. Stabilizer 22 may conversely be bolted to the lower arm and the radius rod 21 may be inserted therein.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A vehicle suspension system comprising:
    (a) a wheel;
    (b) a knuckle arm supporting said wheel;
    (c) a vehicle body having a frame;
    (d) upper and lower arms connecting said knuckle arm to said frame, said lower arm having an attachment aperture defined therethrough substantially longitudinally of said vehicle body;
    (e) a radius rod and a stabilizer each having one end attached to said lower arm in the vicinity of the end of said lower arm connection to said knuckle arm; and
    (f) one of said radius rod and said stabilizer being coupled to the surface of said lower arm, the other of said radius rod and said stabilizer being inserted in said attachment aperture and coupled to said lower arm therein.

2. A vehicle suspension system according to claim 1, wherein said radius rod is coupled to said surface of said lower arm, said stabilizer being coupled to said lower arm in said attachment aperture.

3. A vehicle suspension system according to claim 1, wherein said lower arm has threaded bolt holes defined substantially vertically in said surface thereof, said radius rod having a flattened end coupled to said lower arm and having bolt insertion holes aligned with said threaded bolt holes.

4. A vehicle suspension system according to claim 3, wherein said stabilizer is coupled to said lower arm in said attachment aperture and can be turned about its own axis in twisting motion with respect to said lower arm.

5. A vehicle suspension system according to claim 3, wherein said lower arm has threaded bolt holes defined substantially vertically in said one of upper and lower surfaces thereof, said radius rod having a flattened end coupled to said lower arm and having bolt insertion holes aligned with said threaded bolt holes.

6. A vehicle suspension system according to claim 5, wherein two said threaded bolt holes are defined in said lower arm, said attachment aperture extending through said lower arm between said two threaded bolt holes.

7. A vehicle suspension system according to claim 1, wherein said radius rod has an opposite end including an externally threaded portion extending through said frame and fastened thereto by nuts threaded over said externally threaded portion, whereby said radius rod can be adjusted in length by loosening and tightening said nuts.

8. A vehicle suspension system according to claim 7, wherein said opposite end of said radius rod includes an externally threaded portion extending through said frame and fastened thereto by nuts threaded over said externally threaded portion, whereby said radius rod can be adjusting in length by loosening and tightening said nuts.

9. A vehicle suspension system according to claim 1, wherein said opposite end of said radius rod is fastened to said frame through an assembly of: a main collar loosely fitted over said opposite end of said radius rod, a rubber bushing fitted over said main collar, a pair of washers disposed around said radius rod and held respectively against axial ends of said main collar and said rubber bushing by nuts, and auxiliary collars force-fitted between said main collar and washers and said radius rod, by said nuts held against said washers.

10. A vehicle suspension system according to claim 1 wherein said stabilizer is coupled to said surface of said lower arm and said radius rod is inserted in said attachment aperture and coupled to said lower arm therein.

11. A vehicle suspension system comprising:
(a) a wheel;
(b) a knuckle arm supporting said wheel;
(c) a vehicle body having a frame;
(d) upper and lower arms connecting said knuckle arm to said frame, said lower arm having an attachment aperture defined therethrough substantially longitudinally of said vehicle body;
(e) a radius rod and a stabilizer each having one end attached to said lower arm in the vicinity of said end of said lower arm connected to said knuckle arm; and
(f) one of said radius rod and said stabilizer being coupled to the surface of said lower arm, the other of said radius rod and said stabilizer being inserted in said attachment aperture and coupled to said lower arm therein.

12. A vehicle suspension system comprising:
(a) a wheel;
(b) a knuckle arm supporting said wheel;
(c) a vehicle body having a frame;
(d) a lower arm connecting said knuckle arm to said frame, said lower arm having an attachment aperture defined therethrough and extending substantially horizontally; and
(e) a radius rod having one end attached to said lower arm in the vicinity of the end of said lower arm connected to said knuckle arm;
wherein the opposite end of said radius rod is fastened to said frame through and assembly of: a main collar loosely fitted over said opposite end of said radius rod, a rubber bushing fitted over said main collar, a pair of washers disposed around said radius rod and held respectively against axial ends of said main collar and said rubber bushing by nuts, and auxiliary collars force-fitted between said main collar and washers and said radius rod, by said nuts held against said washers.

13. A vehicle suspension system according to claim 12 wherein said opposite end of said radius rod includes an externally threaded portion extending through said frame and fastened thereto by nuts threaded over said externally threaded portion, whereby said radius rod can be adjusted in length by loosening and tightening said nuts.

* * * * *